United States Patent
Roark et al.

(10) Patent No.: US 8,893,298 B2
(45) Date of Patent: Nov. 18, 2014

(54) NETWORK LINKER FOR SECURE EXECUTION OF UNSECURED APPS ON A DEVICE

(71) Applicant: Mocana Corporation, San Francisco, CA (US)

(72) Inventors: John Roark, San Francisco, CA (US); Dean E. McKee, Irvine, CA (US)

(73) Assignee: Mocana Corporation, San Francisco, CA (US)

( * ) Notice: Subject to any disclaimer, the term of this patent is extended or adjusted under 35 U.S.C. 154(b) by 112 days.

(21) Appl. No.: 13/829,942

(22) Filed: Mar. 14, 2013

(65) Prior Publication Data

US 2013/0205415 A1    Aug. 8, 2013

Related U.S. Application Data

(63) Continuation-in-part of application No. 13/025,994, filed on Feb. 11, 2011, now Pat. No. 8,549,656.

(60) Provisional application No. 61/611,424, filed on Mar. 15, 2012.

(51) Int. Cl.
| | |
|---|---|
| *H04L 29/06* | (2006.01) |
| *G06F 9/44* | (2006.01) |
| *G06F 21/12* | (2013.01) |
| *G06F 21/00* | (2013.01) |
| *H04W 12/08* | (2009.01) |

(52) U.S. Cl.
CPC *G06F 8/24* (2013.01); *G06F 21/12* (2013.01); *G06F 21/00* (2013.01); *H04W 12/08* (2013.01)
USPC ............................................ 726/27; 726/21

(58) Field of Classification Search
USPC ..................................................... 726/21, 27
See application file for complete search history.

(56) References Cited

U.S. PATENT DOCUMENTS

| | | | |
|---|---|---|---|
| 7,941,700 B2 | 5/2011 | Schlesinger et al. | |
| 8,190,785 B2 | 5/2012 | Hill et al. | |
| 2006/0004868 A1* | 1/2006 | Claudatos et al. | ......... 707/104.1 |
| 2006/0271921 A1 | 11/2006 | Cronce et al. | |

(Continued)

OTHER PUBLICATIONS

Guruduth Banavar; Layered, Server-based Support for Object-Oriented Application Development; 1063-5351/95 1995 IEEE.*

(Continued)

*Primary Examiner* — Jeffrey Pwu
*Assistant Examiner* — Thong Truong
(74) *Attorney, Agent, or Firm* — Beyer Law Group LLP

(57) ABSTRACT

An app is made secure using an app wrapping security technique and a network linker that creates an executable binary file of the wrapped app that does not use custom dynamic libraries. The network linker includes a client-side linker component and a server-side linker component. When the app is created and the developer decides to have it security wrapped, an extra parameter is inserted in the client-side linker component for invoking the network linker of the present invention. If a call is being made from app security wrapping code, then the invocation resolves to normal system libraries and the call is not shimmed. Once all the symbols have been resolved on the server-side linker, the executable binary is transmitted back to the client-side linker component where it is digitally signed by the app developer and put in a suitable form for uploading to an app store or marketplace.

20 Claims, 9 Drawing Sheets

(56) References Cited

U.S. PATENT DOCUMENTS

| | | | |
|---|---|---|---|
| 2007/0106958 A1 | 5/2007 | Kumashio |
| 2007/0136207 A1 | 6/2007 | Davydov |
| 2007/0192864 A1 | 8/2007 | Bryant et al. |
| 2007/0245409 A1 | 10/2007 | Harris et al. |
| 2008/0047023 A1 | 2/2008 | Lam et al. |

OTHER PUBLICATIONS

Nukona App Center, "Everything You Need to Secure, Deploy and Manage Your Apps on Personal Devices", https://www.nukona.com/products, Jul. 7, 2011.

Good Technology, Inc., "Taking Secure Steps to Enterprise Mobility—On The Most Popular Devices", http://www.good.com/products, Jul. 7, 2011.

Lookout Mobile Security, https://www.mylookout.com/download, Apr. 2010.

Android Community, "Amazon App Store Lures You in With Free Apps, Makes You Stay if You Want to Keep Them", http://androidcommunity.com/amazon-app-store-lures-you-in-with-free-apps-makes-you-stay-if-you-want-to-keep-them-20110614/?utm_medium=referral&utm_source=pulsenews, pp. 1-2 , Jul. 13, 2011.

International Search Report dated May 23, 2012 from International Application No. PCT/US 12/24080.

Written Opinion dated May 23, 2012 from International Application No. PCT/US 12/24080.

Matt Hamblen, "New Version of Mobile Management Released by MobileIron," Computerworld Online, http://www.computerworld.com/s/article/9184159/New_version_of_mobile_management_released_by_MobileIron, Sep. 9, 2010.

U.S. Office Action dated Oct. 18, 2012 from U.S. Appl. No. 13/025,994.

* cited by examiner

NETWORK LINKER FOR SECURE EXECUTION OF UNSECURED APPS ON A DEVICE

CROSS-REFERENCE TO RELATED APPLICATIONS

This application claims priority under U.S.C. §119(e) to U.S. Provisional Application No. 61/611,424 filed Mar. 15, 2012, entitled "AUTOMATED RE-LINKING OF APPLICATION SOFTWARE ON A MOBILE DEVICE". This application is also a Continuation-in-Part which claims priority under 35 U.S.C. §120 to pending U.S. patent application Ser. No. 13/025,994 filed Feb. 11, 2011, entitled "SECURING AND MANAGING APPS ON A DEVICE". Both applications are hereby incorporated by reference in their entirety.

BACKGROUND OF THE INVENTION

1. Field of the Invention

The present invention relates to software, mobile app, and mobile devices. More specifically, it relates to making mobile apps secure using a network or distributed linker program on two separate computers.

2. Description of the Related Art

At least one common app source from where individuals (the public) can download apps requires that apps be submitted for approval (to be available from the app source) in a particular form. This format may be described, in one embodiment, as a monolithic binary executable. The operator of the app source may not allow app developers to use dynamic libraries, referred to in the art as DYLIBs. As is known in the art, DYLIB is code that is independent of the source code app and is linked separately with the main executable. An app developer is required to compile the source code, take the resulting object files and combine it with any needed libraries using a linker that is supplied by the entity operating the app source. In another embodiment, the linker may be supplied by another entity. In either embodiment, this single linker resolves all links or symbols in the app code and creates an acceptable form of the app which can be made available for download from the app source. In some cases this linking is done locally on the app developer's machine (locally) where the linker and any other linker-related coding tools reside. As noted, in one embodiment, the linker used is supplied by the entity running the app source.

However, app developers may want to add features to their apps, features that they do not develop themselves. One such feature may be making apps secure when executing on a device, referred to as app security wrapping or shielding. App wrapping or shielding may require the use of DYLIBS by the app developer in order to create a final executable. As noted above, this prevents the developer from getting the app approved for posting on the app source. It would be desirable to enable app developers to incorporate a feature which requires DYLIBS into their apps, such as app security wrapping, while still being able to meet requirements of app source entities but allowing the app to achieve the functionality of the feature.

SUMMARY OF THE INVENTION

In one aspect of the present invention, a method of linking an app so that it is security wrapped and does not use custom dynamic libraries (DYLIBS) so that the security-wrapped app can be made available from app stores or app markets that prohibit the use of custom DYLIBS in its apps. The method uses a network linker that includes a client-side linker component and a server-side linker component. When the app is created and the developer decides to have it security wrapped, an extra parameter is inserted in the client side linker component for invoking the network linker of the present invention. This extra parameter may be referred to as a linker flag. Certain data on the client component are serialized and made suitable for transmission over a network to the server-side linker component. In one embodiment, the server-side linker component is operated by an app security provider.

On the service linker component, during execution each of the symbol invocations is examined and a determination is made as to where the invocation is being made from, that is, where the invocation lives. It will either be made from within the app code or from within the app security wrapping code that was injected into the app code by the developer. If the invocation is being made from app code (non-injected, original code), then it is replaced with a substitute invocation that makes a call to a security software library. After the security program invokes it's replacement/equivalent function and performs any security-related processing on the data, the app security program eventually invokes the original function. As such, the original invocation is said to be shimmed rather than completely substituted, never to be called or invoked thereafter.

If the call is being made from app security wrapping code, then the invocation resolves to normal system libraries and the call does not have to be shimmed. Once all the symbols have been resolved on the server-side linker, the executable binary is transmitted back to the client-side linker component where it is digitally signed by the app developer and put in a suitable form for uploading to an app store or marketplace.

BRIEF DESCRIPTION OF THE DRAWINGS

References are made to the accompanying drawings, which form a part of the description and in which are shown, by way of illustration, specific embodiments of the present invention.

DETAILED DESCRIPTION OF THE INVENTION

Figure 1A:
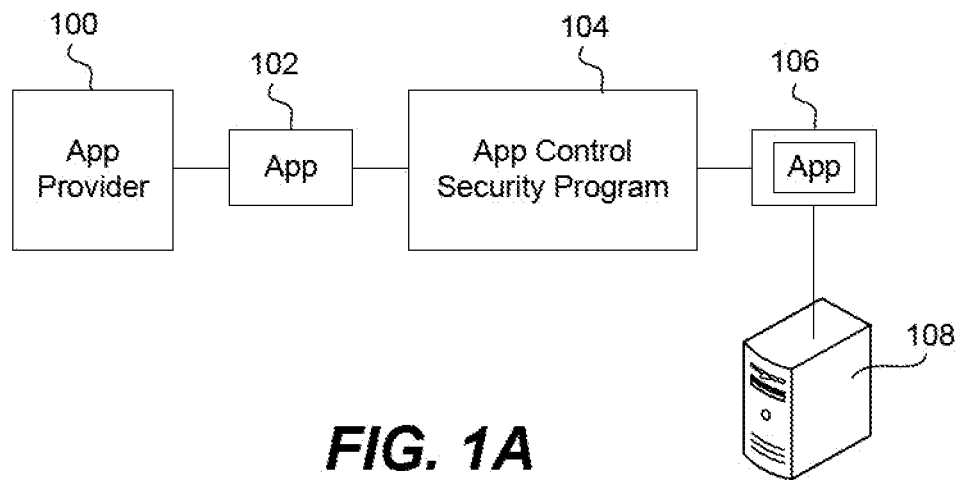
FIG. 1A is a block diagram showing an overview of the app control process of the present invention.

Example embodiments of an application security process and system are described. These examples and embodiments are provided solely to add context and aid in the understanding of the invention. Thus, it will be apparent to one skilled in the art that the present invention may be practiced without some or all of the specific details described herein. In other instances, well-known concepts have not been described in detail in order to avoid unnecessarily obscuring the present invention. Other applications and examples are possible, such that the following examples, illustrations, and contexts should not be taken as definitive or limiting either in scope or setting. Although these embodiments are described in sufficient detail to enable one skilled in the art to practice the invention, these examples, illustrations, and contexts are not limiting, and other embodiments may be used and changes may be made without departing from the spirit and scope of the invention.

Methods and system for preventing device software applications from infecting or otherwise damaging a device, in particular, a mobile device, are described in the various figures. These types of applications, used often on a variety of mobile devices, such as smart phones, tablet computers, gaming devices, and portable computing devices are commonly referred to as "apps." These apps may also be downloaded on to non-mobile devices, such as TVs, computers, automobiles, and other emerging smart device categories. Methods and systems described are not intended to be limited to operation on mobile devices. These device programs or apps have proliferated and are now very prevalent. Currently, apps are typically written in either Java or C. The methods and systems described herein may be applied to apps written in either or to apps written in other languages for different platforms. Most apps, if not all, have to communicate with the mobile device's operating system to get a specific service that the app needs in order to perform its intended function and this service is usually only available from the operating system. A common example of such a service used is GPS to get the location of the device which the app may need. However, because of this exposure, apps are a vulnerability for the device and pose a security and privacy risk for the user. Companies want to be able enforce a centralized policy to control and secure access to its data and software. This is also true for end users (i.e., individuals, home users, and the like). It enables enterprise IT departments to maintain governance of corporate data. The methods described below provide a centralized way to control security with respect to apps that are downloaded onto mobile devices, where the devices are either an employee's personal phone or an employer's phone, so that those apps do not pose a security threat. Various embodiments of the invention may also be used by parents and individuals (i.e., in home or non-work environments) to ensure that their personal mobile devices are safe from malware and may also be used to apply controls, such as on usage. Embodiments of the app control software of the present invention may also be used for mobile device data protection and back-up and for application-level telemetry.

FIG. 1A is a block diagram showing an overview of the app control process of the present invention. It is a generic description of one process without being tied to a specific configuration or environment. An app 102 is provided by app provider 100 which can be any type of entity (individual, software developer, employer, etc.). It is generally unprotected and the only security surrounding it is provided by the operating system. The only shield and checking done on how it executes on the device once loaded is provided by the operating system.

The present invention enables additional security of the apps that is not provided by the device's operating system. A security application program 104 is applied to app 102. Or the app 102 is input to program 104, which may be supplied by a third-party app security provider. In one embodiment, security application program 104 has a policy manager and a policy wrapper which may be in different locations. They are described in greater detail in FIG. 2. Once security program 104 has been applied to app 102, the app is wrapped with a security layer so that the device is protected. It is shown as secured app 106. In one embodiment, secured app 106 is then downloaded onto a mobile device 108, such as a smart phone or tablet computer, where it executes securely without risking damage to device 108. Another benefit is that secured app 106 may also be managed by the company or other entity that is providing the app to the user, such as an employer providing the app to an employee. For example, if the user leaves the company, the company may automatically delete the app and any related data from the device. In another example, a parent may be able to limit the apps used by another person (e.g., a child) or to limit the amount of time, e.g., 10 minutes a day or limit which Web sites may be accessed by an app. Or, a parent is concerned that an app is leaking a child's location to unknown third parties. There may be numerous other examples. As noted, FIG. 1A is intended to show the general process of securing an app and downloading it onto a device. Note that in this embodiment, app 102 is not made secure from causing harm to the device after it is downloaded onto the device, but before. In another embodiment, the app is secured after it is downloaded onto the device, but before it can interact with the operating system.

Figure 1B:
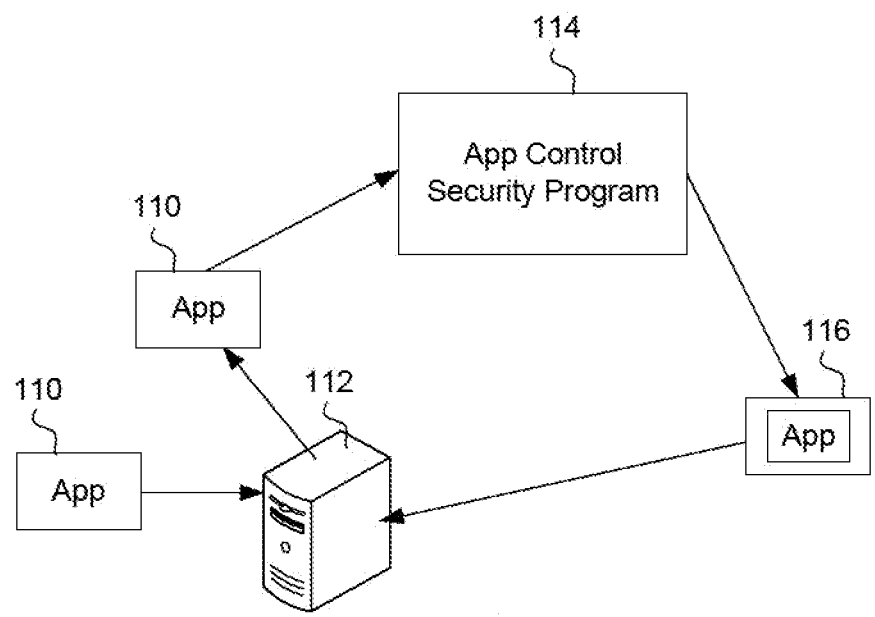
FIG. 1B is a block diagram showing an alternative embodiment of an app control process of the present invention.

FIG. 1B is a block diagram showing an alternative embodiment. An unsecured app 110 (also supplied by an app provider) is downloaded onto mobile device 112. In this embodiment, however, there may be a specially designed app on device 112 that blocks the actual installation of unsecured app 110. The special app (not shown) redirects unsecured app 110 to an app security program 114. The unsecured app 110 is wrapped in a security policy, the resulting app shown as secured app 116. It is then downloaded and allowed to be installed on device 112 by the special app. In this manner, an individual or home user, for example, who wants to protect her phone from security threats posed by apps, can have apps made secure (wrapped) by a third-party service or by her mobile phone carrier, to mention only two examples, before they are downloaded on to her phone. It should be noted that this security wrapping can be done to an app regardless of where the user downloads the app from. It may also be noted that in FIGS. 1A and 1B, the network and connections between the components and software are shown generically. The transmissions are primarily over the Internet (not shown) but may also be within a private network or both.

Figure 2:
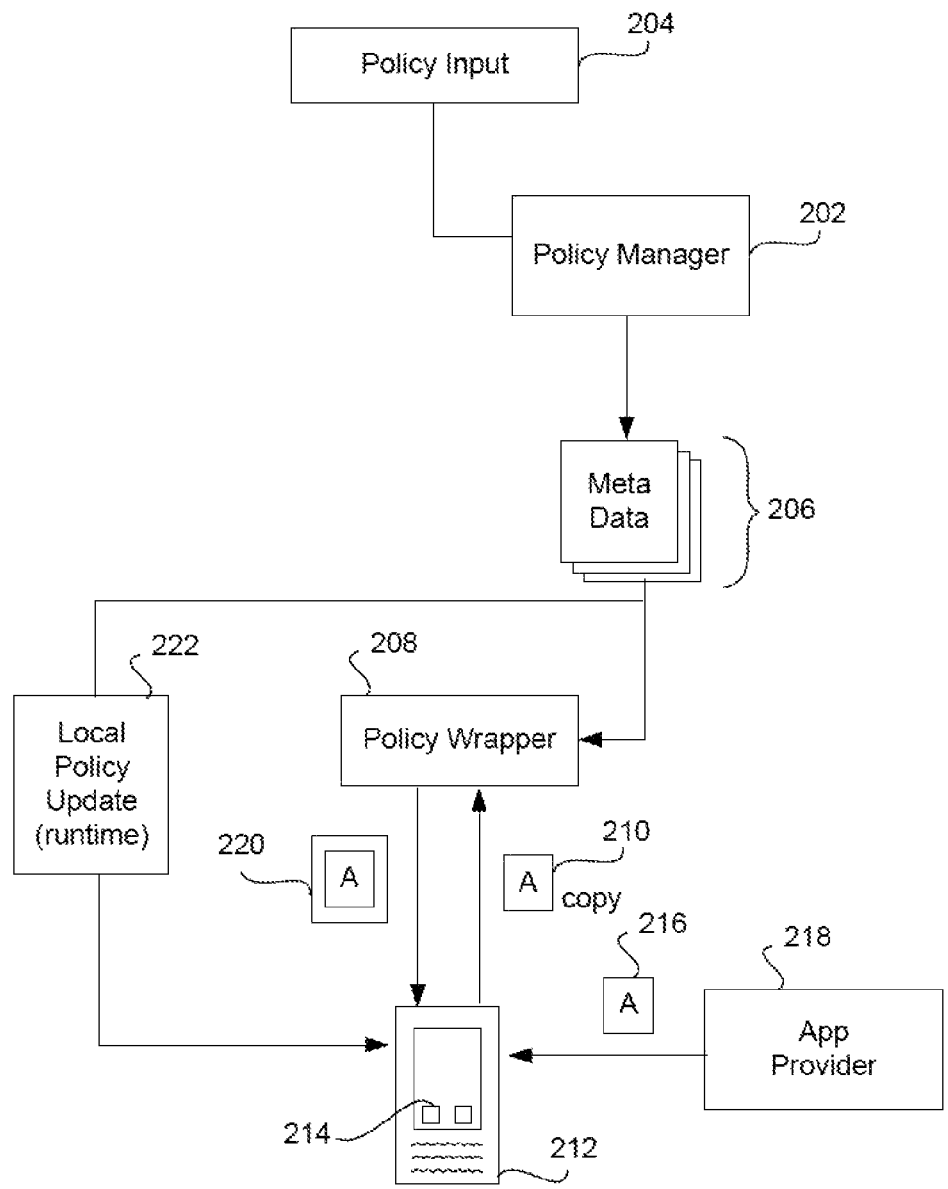
FIG. 2 is a block diagram showing components of an app security program in accordance with one embodiment of the present invention.

FIG. 2 is a block diagram showing components of an app security program in accordance with one embodiment of the present invention. In one embodiment, the security program has two major components, a policy manager and a policy wrapper. A policy manager 202 accepts input from an administrator or other individual who is responsible for setting security for the mobile device. The person may be referred to as the governor since he is governing the security of the one or more mobile devices. The security policy may be set using various user interface screens. There are numerous examples of policies, including geo-fencing (e.g., the app can only be used in a building) and others. The service provider or the entity providing the app security program may also provide default policy and security settings which may be useful for home users. Examples of policy settings are described below. Policy input 204 is inputted into policy manager 202. Policy manager 202 takes the input/settings from the governor and creates policies or meta-data 206. The format or form of meta-data 206 can vary. They essentially reflect the policy settings from the governor.

Metadata (policies) 206 may be used as input to a policy wrapper 208. In one embodiment, this component of the program takes the policies and uses them to secure an app 210 by wrapping it. Wrapper 208 receives an app 210 from a handheld device 212. In one embodiment, wrapper 208 receives a copy of an app 210 instead of the original app 214 that was downloaded onto phone 212 (see FIG. 1B above). Here the handheld device 212 user attempts to download an unsecured app 216 from an app provider 218. In the scenario in described in FIG. 1A, it may operate on the app itself instead of a copy. This may be the case where a market place or app store offers customers a secured version of the app along with an unsecured version (or only offer the secured version). A secured version 220 (security-wrapped version) is returned from policy wrapper 208 to device 212.

Metadata 206 may also be used to update a local policy file (an existing policy that is already on the device). A local policy file is used to update policy parameters residing on device 212. For example, in the case of "geofencing" (i.e., restricting use of an app to an certain physical areas) it is likely that the GPS locations controlled by the governor will change over time. When such a change occurs, the new policies can be applied in two different ways. One is to generate a new policy and apply it to the original app (i.e., wrap the app with the new policy). Another way is to allow dynamic configuration based on a local policy data file with the "variable" part of the policy encrypted/signed inside it. For example, an IT person may want the ability to override a configuration on a device directly through an IT app residing on the device for diagnostic purposes.

In one embodiment policies have two components: a fixed part and a variable part. The fixed part is the content described in the policy file (e.g., "protect the GPS at certain times of day"). The variable part typically is provided by the governor through a console (e.g. "what are the times when the GPS should be protected?"). The variable part can change without applying a new policy.

Policy designers can choose to forego the variable component of the policy and basically "embed" all data or content statically in the policy file. In this case, the console does not have any way to customize the policy.

If the policy designer chooses to include some variable component in the policy, when changes are made to the variable data (on the console), a new data file could be sent to the device to reflect the latest changes. Such a file would be encrypted/signed (to prevent a malicious app circumventing the policy), downloaded to the device, and used by the app security code on the device to apply the new data to the appropriate policy.

Such changes and updates may be done by local policy update component 222 at runtime. This component creates updated policy parameters on device 212. Thereafter, wrapped app 220 will use the updated policy parameters.

In one embodiment, policy manager 202 and policy wrapper 208 are components in the same app security program and may operate on the same computer. In other embodiments, the manager and wrapper components may be on separate computers. For example, the policy manager 202 may be on a server at one site and the policy wrapper 208 may be on a computer at another site and may be managed by a different entity or the same entity. Collectively the manager and wrapper form the app security program which, in one embodiment, is operated by a security service provider. It may also be provided by an enterprise, such as a company, employer, business partner, and the like, or by a mobile phone carrier.

Figure 3:
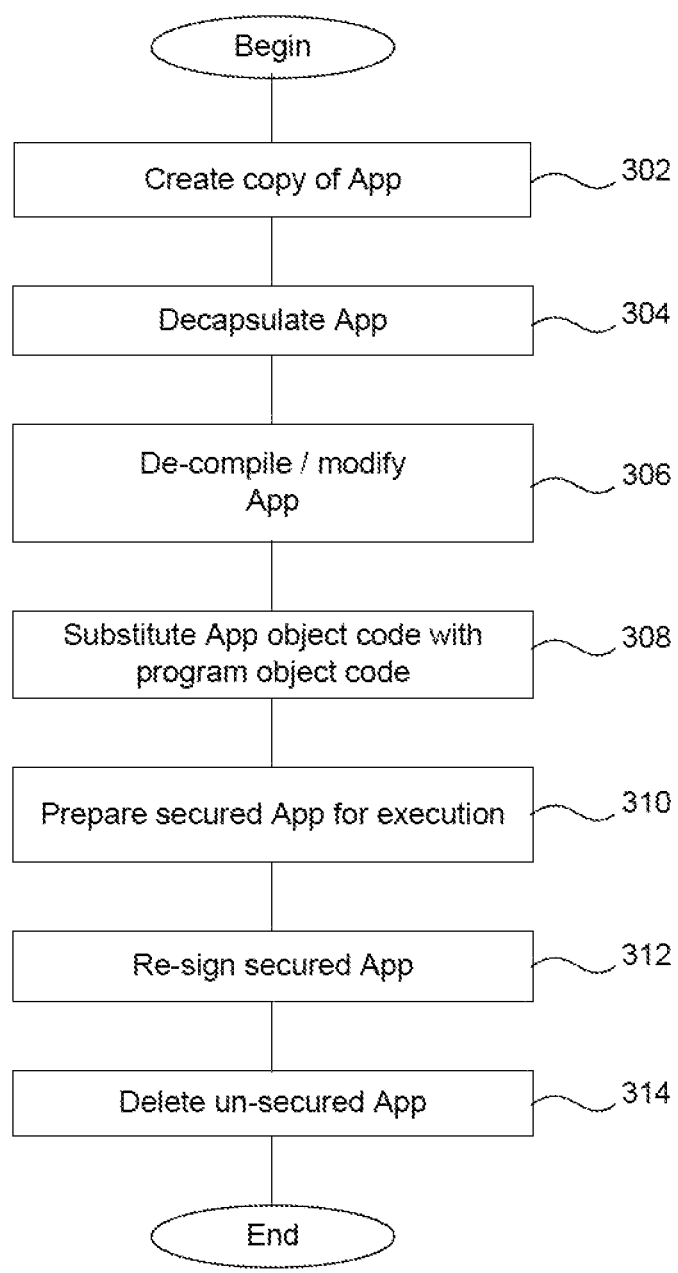
FIG. 3 is a flow diagram showing a process of making an app secure before downloading it on to a device in accordance with one embodiment of the present invention.

FIG. 3 is a flow diagram showing a process of making an app secure before downloading it on to a device in accordance with one embodiment of the present invention. At step 302 a copy or clone of the app that is to be secured is made on the device. In one embodiment, this may be done on the mobile device itself or may be done off the device, for example, on components on the Internet, in the cloud, on an enterprise's server or on a carrier server. The user may be an individual, an employee of a company or other entity. As is known in the field, an app may be obtained in a number of ways, most typically from an app store or an app market, or directly from the app developer or provider or in any suitable manner. By making a copy, the original app is preserved giving the user an option to use either the secured or unsecured version and also protects the user's ability to use the app if something goes wrong with the app control process. Note that in one embodiment, the app is not yet downloaded on to the phone. In one embodiment, the methods described below are performed on separate computing devices. In another embodiment, the process may be performed on a mobile device, but the app is only executed on the device after the process is complete and the app has been made secure.

At step 304 the app is decapsulated. Most, if not all, apps have digital signatures signed by the author/developer. At step 304, as part of the decapsulation, the digital signature is removed from the app. This may be done using techniques known in the art. Decrypting the app may also be performed at this step. These and other steps provide the core object code of the app which may now be operated on by the app control program. The nature and specifics of this operation may depend on the mobile device's operating system.

There are several examples of operating systems for smart phones such as iOS (for the iPhone), Android (used on handsets from various manufacturers), Windows Mobile 7, Web O/S, Palm, and others. At step 306, the core object code app may be either disassembled or decompiled to obtain the executable object code. For example, it can be either "native code" (CPU instructions) or bytecode (virtual machine instructions, such as Java or .Net). In one embodiment, this may be more of a modification process if the device runs iOS where the disassembly is closer to a process of locating and substituting certain links and terms. However, in general, the disassembly process to obtain the object code of an app after it has been decapsulated may be done using techniques known in the art, such as using disassemblers.

At step 308 the app object code is augmented with object code from the app security program. For example, this object code may include class files which are replaced with class files from the security program. The object code generally provides an interface to the mobile device operating system. The app control security program object code is derived, in part, from the policy/meta-data described above. In the case of iOS, the operation is different in that a 'locate and substitute' process occurs rather than an object code replacement. This takes into consideration an interrupt approach that iOS's uses. Generally, the app security program goes through the assembly language code. The specific items located are Software Interrupts (SWIs) within the object code and which are replaced with a branch to an app control security program layer which may then determine what further actions to take, such as making the request, enhancing the results, and others, as described below.

At step 310, after substitution of the object code (or substitutions of SWIs) has been made, the app security program prepares the security wrapped app for execution on the mobile device. The object code substituted into the app by the security program generally provides a bridge or connection between the app and the mobile device operating system. The security program class files may be described as wrapping around the operating system class files. The app security program class files are generated based on the policies created earlier (by input from the governor). The app is essentially re-wired for execution on the handset. It is re-wired to use the app security program layer in addition to the security provided by the mobile device operating system layer. That is, the secured app may still be subject to the security provisions of the operating system. In one embodiment, certain cosmetic changes may also be made to the app, such as changing the icon for the app to reflect that it is secured. By doing this, the user can be sure that when the app icon appears on the handset screen that the secured version of the app will be executed. The app has now essentially been re-factored or re-programmed by the security program.

At step 312 the app is signed with a new key, for example, with the key of the service provider or the key of the enterprise providing the secured app. The re-factored, secured version of the app is returned to the handset device. In another embodiment, the app is wrapped with the security layer on the phone. At step 314, in one embodiment, the original, unsecured copy of the app is deleted from the handset device. This may be done by the secured version of the app once it is downloaded onto the handset. In other embodiments, this is not done and both versions remain on the mobile device. At this stage the process is complete.

Figure 4:
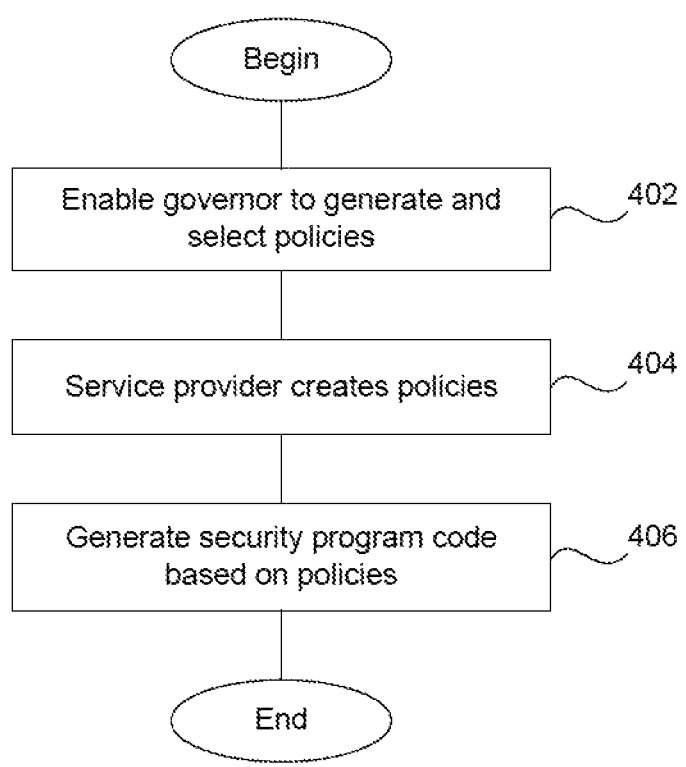
FIG. 4 is a flow diagram of a method performed in policy manager in accordance with one embodiment.

FIG. 4 is a flow diagram of a method performed in policy manager 202 in accordance with one embodiment. At step 402 the governor or other security policy individual is enabled to define, generate, and create security policies. This may be a network administrator for an enterprise deciding a vast array of mobile device security policies for hundreds of employees using dozens of enterprise apps (specifically for work) that may be downloaded on hundreds or thousands of mobile devices. On the other end of the spectrum, it may be a parent who is setting security policy for three or four apps downloaded by her child on a new mobile device. Other examples include preventing or squashing a gaming app using GPS, preventing an app from using a microphone on the device to record or eavesdrop on a conversation, among many others. In either case, the governor may take into consideration the category of the app, the type and nature of app, the author, the age-appropriateness, and numerous other factors. For example, has the same author written any other apps that may have been classified as malware or posed a security threat to the device. It may determine whether there are other apps by the same author. It is at this stage that the governor decides which rules to apply for each app. In one embodiment, this is done off-line by the governor. That is, it may be done using user interfaces on a home computer or on an enterprise network computer used by an administrator where security templates provided by the security program service provider (essentially default templates) may be used or very specific rules may be set using the templates.

At step 404 the security data input at step 402 is used by the app control security program to create the actual policies. At step 406 the app control security program object code is generated based on the input from the governor regarding security policies created at step 404. The governor or service provider may also update existing security policies if needed. As described above, the object code may be used to enhance certain original object code obtained from the disassembled app. The enhancement code is inserted to adjust security and privacy settings for an app in order to protect the enterprise and end user. The original app's behavior is altered which allows the governor to control how the app behaves. For example, if an app stores sensitive account information in the clear (i.e., un-encrypted), the behavior could be changed so that all information the app creates is stored in encrypted form and which can only be accessed by that app given that the key to the stored, persistent data would be unique to the app. In many instances the enhancement code can improve the apps performance since the code is optimized for a particular use scenario.

Figure 5:
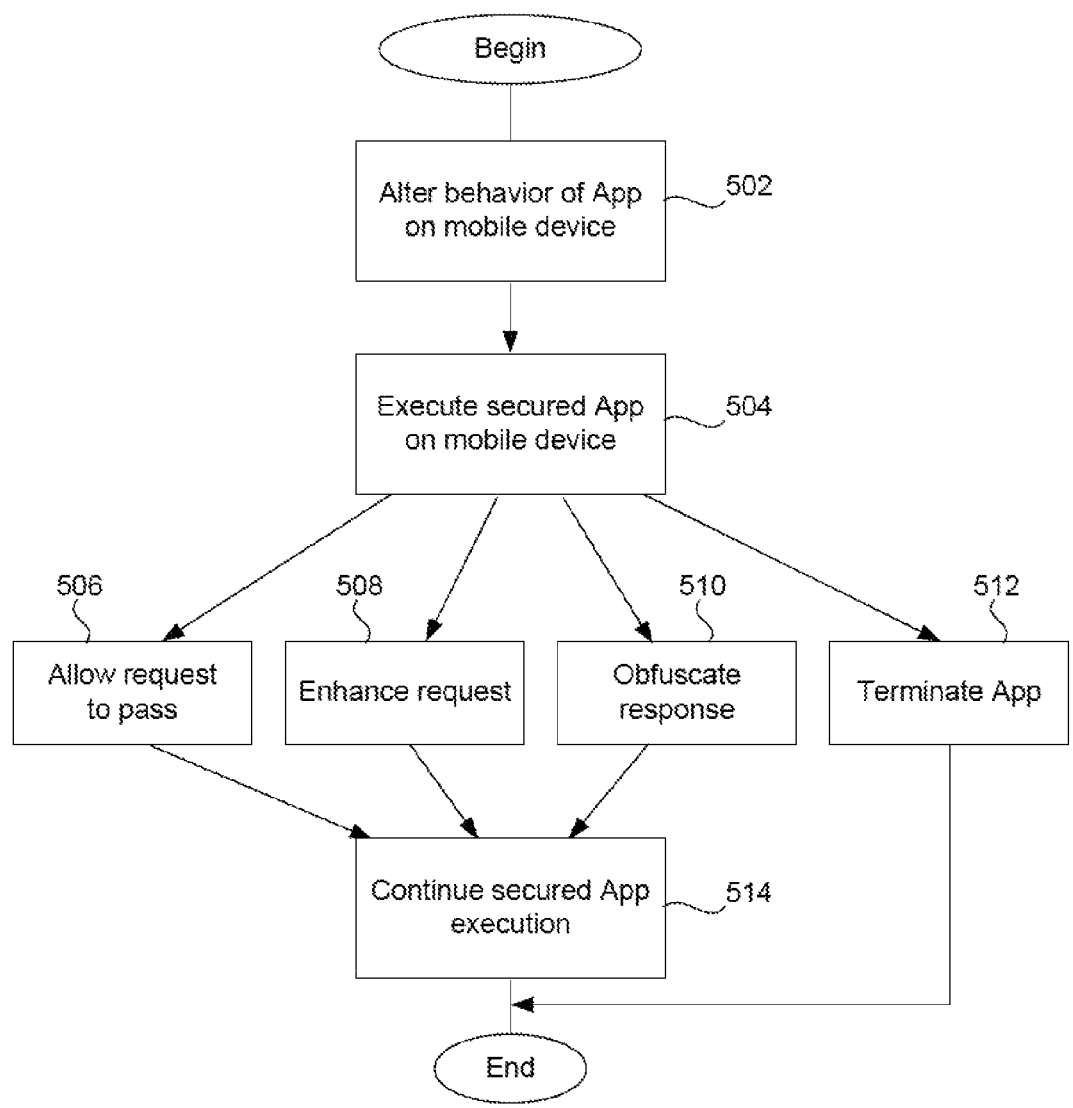
FIG. 5 is a flow diagram showing a process of a security-wrapped app executing on a handset or mobile device in accordance with one embodiment.

FIG. 5 is a flow diagram showing a process of a security-wrapped app executing on a handset or mobile device in accordance with one embodiment. At step 502 the behavior of the app when the app executes or immediately before it executes on the device is altered or modified. For example, behavior modification may include authentication during app initialization; e.g. smart/CAC card, or password challenge. Some apps, as originally designed, may not require a password for security, however, a secured version of an app which has been modified may require that the user enter a password. At step 504 the secured app executes on the mobile device by the user activating it (e.g., tapping on the icon if the device has a touch screen). Upon execution of the app, in one embodiment, control can take one of four options. As is known in the art, when an app executes, it makes calls or requests to the device operating system in order to carry out its functions. In many cases these calls may be harmless or pose no significant security threat to the phone or device. If this is the case, the call may be allowed to pass to the operating system as shown in step 506. Here the call is made to the device operating system and the app executes in a normal manner.

If the security layer or wrapper around the app detects that the app is making a request that may pose a security threat to the device, the app security layer may enhance or modify the request before it is passed to the operating system or other software or hardware component in the phone. This is shown at step 508. In one embodiment, the governor determines which calls are permissible by examining the one or more policies. For example, the governor may determine that all data should be saved in encrypted form. In another example, the governor may decide that only a select group of trusted apps should have data on a soldier's GPS coordinate. In one embodiment, there is no runtime logic to determine what is safe, a potential threat, or an actual threat; it is essentially pre-declared by the governor in the policy created at step 404 above. In another embodiment, there may be some runtime logic. For example, an app may be trying to send out expensive SMS text messages. The app control program may determine this and block the app from sending more than a certain number of text messages, for example, it may limit it to transmission of one message. The enhancement may be adding something new, such as a password requirement. In another example, if the call is to save data on the mobile device memory, the secured app may actually back up the data to a storage area in the cloud or on the Internet (i.e., off the device). In another example, the data related to the call may be encrypted.

At step 510 the secured app may determine that the call is an actual threat and should be dealt with in a more severe manner than at step 508. For example, it may have decided that based on the policy for an app, that if a camera on the device is accessed while in a secure building (e.g., the Pentagon), the app should immediately be terminated. Merely enhancing the request may not be sufficient in this case. At step 510, the request may not be allowed to proceed to the operating system or any other component of the device. However, in one embodiment, a response is returned to the app, but that response is intentionally not accurate or correct. It is essentially an obfuscated response. For example, it may be a GPS coordinate that is not the actual physical coordinate of the device (e.g., the device is in California, but the GPS coordinate that is returned to the app is a coordinate in Nebraska). This may be desirable when apps are used by children. Other examples may be returning bad or garbled data results if an app that should only run within a restrictive environment (e.g., a secure office area) is determined to be running outside that environment (e.g., at home). In this example, the app may be partially crippled so that the app can only access unclassified data and wherein classified information is nullified. In another example, when a user is attempting to paste or copy sensitive data from a classified app to a non-classified app, the app control program may change the copy of the data that is being pasted to garbage or essentially make it meaningless. After either steps 506, 508, or 510 have completed, the security-wrapped app continues execution on the mobile device at step 514.

At step 512 the security layer around the app has determined that the call being made by the app or that the app execution behavior in general poses too high a security threat level to the mobile device. In this extreme case, the security layer decides to terminate execution of the app and/or delete the app. For example, the app may be using too many resources on the phone, such as bandwidth, or is making too many high-risk calls to the operating system thereby over-exposing the mobile device. In this case, the app can simply be deleted from the phone or the app may be terminated. The user may not be able to re-execute it or re-install it. For example, an employee may not install that app again on the company phone because it was exposing sensitive company data. Or it may be determined that an app is secretly collecting data on the phone or installing malware.

Figure 6:
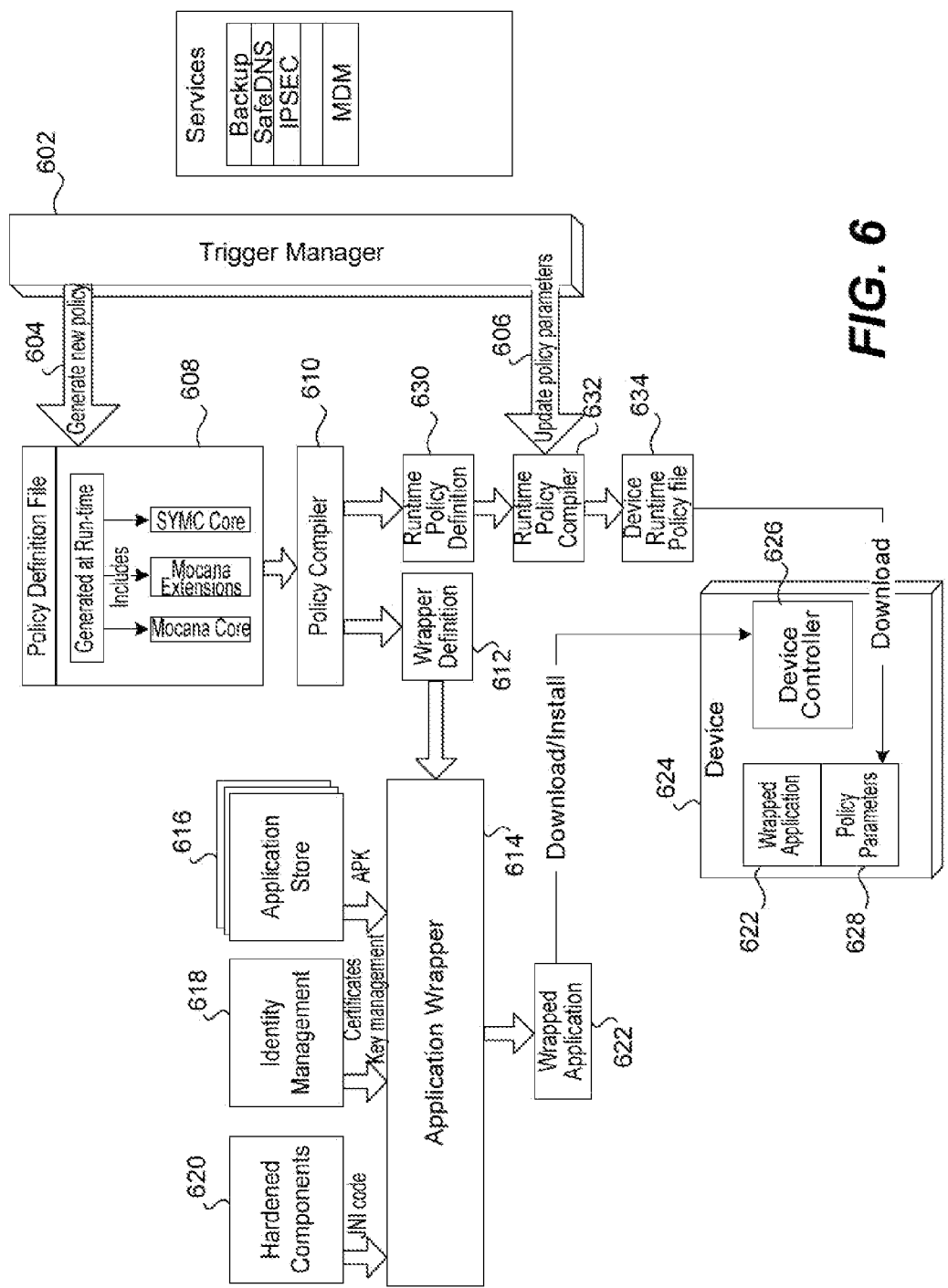
FIG. 6 is a system architecture diagram of the app security control system in accordance with one embodiment.

FIG. 6 is a system architecture diagram of the app security control system in accordance with one embodiment. A trigger manager component 602 handles two events, one for generating a new policy 604 and another for updating policy parameters 606. Such events can be triggered by various systems. For example, a console administrator or governor might apply a new policy to all devices (a manual operation). Or a network monitoring application, after detecting suspicious traffic originating from a device (or app), could push a new policy that would prevent a user/device/app from accessing network resources (an example of an automated operation). The various systems or entities that have the authority to change/update polices, do so through the trigger manager 602.

New policy output 604 is input to a policy definition file 608 which may be generated at runtime and may include various types of code and extensions, for example, specific to the app control service provider, or to the app/user/device the policy applies to. Policy definition file 608 is input to a policy compiler 610 which has two outputs. One output is a wrapper definition file 612. This file is input to an app wrapper component 614. App wrapper component 614 is responsible for generating secure app by injecting custom binary code (native or bytecode) into an app, downloaded directly, for example, from an app store. Or the app could be an app the user downloaded on to his device, and then uploaded to an "App-Control" server.

App wrapper component 614 may have three inputs: apps from one or more app stores 616, certificate key management data from identity management component 618, and hardened components 620. Key management data is used to tie the identities of the user, device, and the app, and ensure that any operation subject to policy control can be tied to a specific user/device/app. This also ensures that a wrapped application can only be run on a specific device to prevent a malicious app from circumventing policies and hardened components 620 (for example "Device security framework"). The output from app wrapper 614 is a wrapped app 622 which is downloaded or installed onto mobile device 624 via the device's controller 626. Device controller 626 responsibilities include: download app from the app wrapper; ensure that app running on the devices are appropriately wrapped apps (e.g., app wrapped for user1 should not be installed/run on device for user2); report list/version of installed applications to allow the management console to control policies for each device/user/application; and download policy parameters when appropriate. Wrapped app 622 resides on device 624 coupled with policy parameters 628.

Returning now to policy compiler 610, the other output is a runtime policy definition file 630. This file is input to a runtime policy compiler 632 which also accepts as input policy parameters 606 (specified by the management console, or other subsystems). Output from compiler 632 is a device runtime policy file 634. This file 634 is downloaded onto device 624 as shown as policy parameters 628, and is used to customize the policies applied to wrapped app 622.

Described below are various use cases and capabilities of the app control security program of the present invention. One use case involves the separation of work life and personal life on a mobile phone. There are apps for the user's personal use and apps that the user's employer (or a business partner of the employer) may have provided and the apps operate on the same phone, which is often the user's personal phone. The governor who determines security of the apps that need to be secured on the user's phone may block copy/paste operations between apps (such as e-mail apps). The governor may set policies for the work-related apps that perform selective wipes of apps and associated files. User location-based policies may also control where certain apps may execute. Examples of levels of protection because of malware are denying access to contacts, denying transmission of SMS without consent, and the like.

Another example of a use case is app control. Using the present invention, white and black listing of apps may be implemented, as well as full deletion of apps according to the policies set by a governor. An app may be 'sandboxed' to protect the other apps, software, and hardware of the device. Other capabilities may include identity-based control of apps or services and highly granular control over app behavior. Trojan identification is another use case that can be implemented with the app security program. For example, each app and content may be encrypted to prevent rogue apps from gaining access to and stealing confidential data on the phone. The security program may also be able to identify anomalous system call behavior of an app to identify malicious Trojan apps that act outside of their published intent.

Another use case is back-up and recovery of app data in which IT security administrators and governors have data revision control and can implement app and device content migration through back-up and restore operations. In another use case is network traffic monitoring. The app on the mobile device may be brought under the visibility of existing enterprise IDS/IPS/Web filtering infrastructure to allow for inspection and control of app communications. The app security program can also integrate with third-party DNS services, such as Symantec's DNS service to identify malware. All app communications may be encrypted, including communications at the mobile phone service provider. Other use cases include session continuity, consumer privacy (e.g., GPS obfuscation, implementing safe DNSs), and intercepting payment/transaction messages from the mobile device (i.e., operating in the middle of mobile commerce streams).

In one embodiment, the app security service is offered by a third-party service provider, for example, to make apps used by end-users or individuals (i.e., users not associated with an employer or enterprise). For example, a parent may want to obfuscate the GPS of a child's phone because the parent does not want a social network site, such as Facebook, to know where the child is, essentially disabling GPS. In another embodiment, an app store, operated by a wireless phone carrier (e.g., Verizon, AT&T) may offer a secured app for an extra charge or premium. A customer of the carrier can download the secured app from the marketplace or online store instead of the unsecured version by paying an extra amount. In another embodiment, an enterprise may have its own app store for its employees, partners, and the like, where users can only download secured versions of the apps (which may be referred to as "hard" apps). These apps may have many of the security features described above as defined by a governor (security administrator) at the enterprise, such as blocking copying and pasting e-mail or corporate data, killing an app from the user's phone if the user leaves the company, and so on. A mobile phone carrier's DNS can typically access any site, but the app security program can block a mobile device browser so that it can access only a safe DNS (e.g., Symantec's DNS) from where only safe Web sites may be accessed. In another embodiment, the app security program provider can work with the mobile device manufacturer to incorporate the app security program or functionality into the hardware and software operations of the device. In this embodiment, described below, a user can download an unsecured app and make is secured on the phone or device itself before executing and does not have to access a third-party service to have the app secured or ensure that the app is secured before being downloaded onto the device.

As can be seen from various embodiments described above, the security of the mobile device extends beyond the device itself and is applied directly to the apps that are downloaded onto the device. Companies and other entities are able to take advantage of apps more freely without having to worry about the security risks, such as data leakage or malware infection of the company's enterprise IT system. Companies can maintain governance of its corporate data.

In another aspect of the present invention, an app is wrapped using the security wrapping methods described in FIGS. 1-6 above resulting in a single, self-contained or "monolithic" executable binary file that does not use custom DYLIBS. This is created using what may be referred to as a network linker of the present invention. By virtue of being security wrapped using methods described above, the app uses DYLIBS. However, by use of the network linker of the present invention, a monolithic executable binary file is created. As noted above, such a binary, executable file may be needed if the developer wants to put the app in a publicly accessible app store or marketplace which does not allow custom DYLIBS in the apps.

Figure 7:
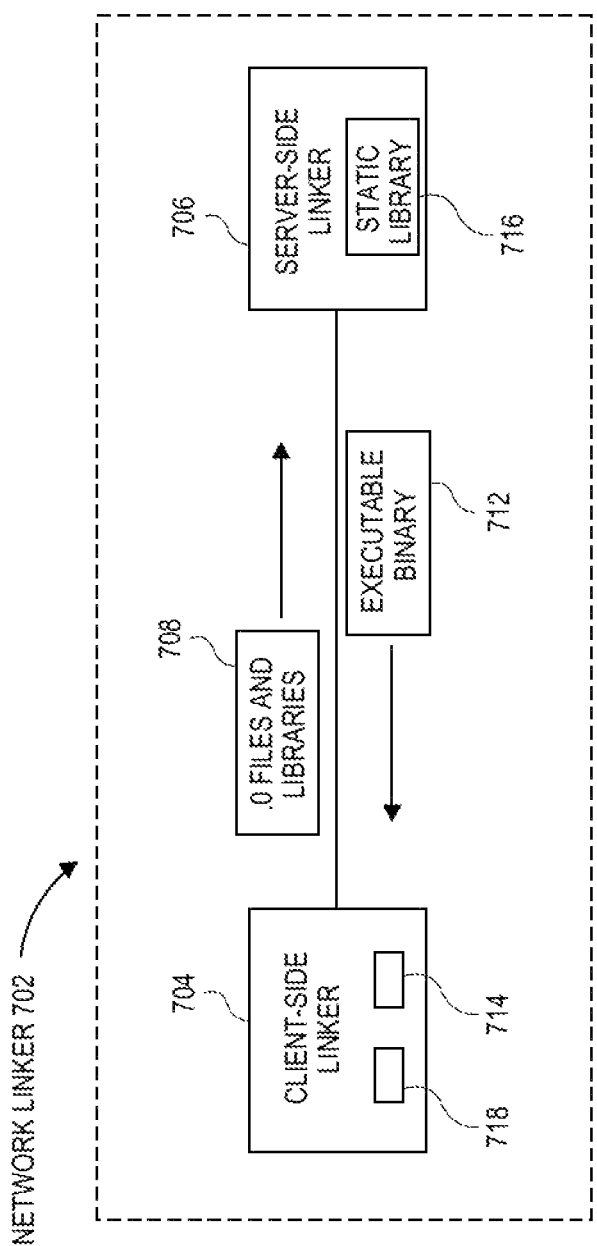
FIG. 7 is a block diagram showing two components of a network linker in accordance with one embodiment of the present invention.

As is known in the art, source code is compiled to object files which are combined with shared or static libraries by a linker to produce, in some cases, a monolithic binary executable. The combination of all the components and the resolution of links, symbols, and the like is done by a linker. In one embodiment of the present invention, the novel linker may be referred to as a network linker for reasons described below. FIG. 7 is a block diagram showing two components of a network linker in accordance with one embodiment of the present invention. In other embodiments, there may be more than two components or modules comprising the network linker. The components of the network linker may be derived from an existing, conventional linker, for example, an open source linker, or may be developed from scratch and not derived from any existing code. In the described embodiment, a network linker 702 includes a client-side linker 704 and a server-side linker 706. Client-side linker component 704 will typically reside and execute on the app developer's computer. Server-side linker component 706 resides on a server operated by an app security provider, such as Mocana Corporation of San Francisco, Calif. Server-side linker component 706 may also be under the control of a third-party, such as a company or other entity for which the app is being developed. As described in greater detail below, network linker 702 is invoked when app security wrapping of the present invention is being applied to an app (as desired by the app developer) without the user of custom DYLIBS. In other words, it is invoked when app security wrapping code is injected into the app code. If the app is not wrapped or shielded, then network linker 702 is not needed and a conventional linker may be used on the developer's computer. However, network linker 702 may still be used and the resulting executable binary would perform be the same although the resolved links would be different.

As noted, code for client-side linker component 704 resides on an app developer's computer. In one embodiment, linker component 704 has a special parameter set that enables invoking certain network operations and communication with a server, specifically server-side linker component 706. In some embodiments, client-side linker 704 is derived from a conventional linker and contains code relevant to client-side operations and is modified in that it has an extra parameter 714 for invoking network communications. The parameter may be set by going into settings for client-side linker 704 and passing an extra flag to the linker. This extra "linker flag" may be defined by the app security provider and supplied to the app developer.

If client-side linker 704 determines that the app has been "flagged" for app security wrapping, then the object files and libraries are transmitted to a server operated, for example, by the entity providing the app security wrapping feature to the app developer. Setting the linker flag parameter indicates to client-side linker 704 that app security wrapping code has been injected into the app and that server-side linker 706 needs to be used. When client-side linker 704 sees flag 714, a process begins to link the app code containing static versions of the DYLIB libraries (there because of the app security wrapping software) remotely. When client linker 704 sees the linker flag, all the object files, including parameters, symbols, invocations, and the like, are serialized. That is, they are converted from a first format as stored in memory on the client machine to a format in which the data can be transmitted over a network to server-side linker 706.

Server linker component 706 has a static library that is used by the app security wrapping software. As noted, server linker 706 is a component of network linker 702 (as is client-side linker 704) and performs most of the actual linking functionality of network linker 702. As described in greater detail below, in performing its linking operations, if there is a certain category of link or symbol or, if server linker component 706 attempts to perform a certain set of functions, a shimming or replacement operation is performed.

Figure 8:
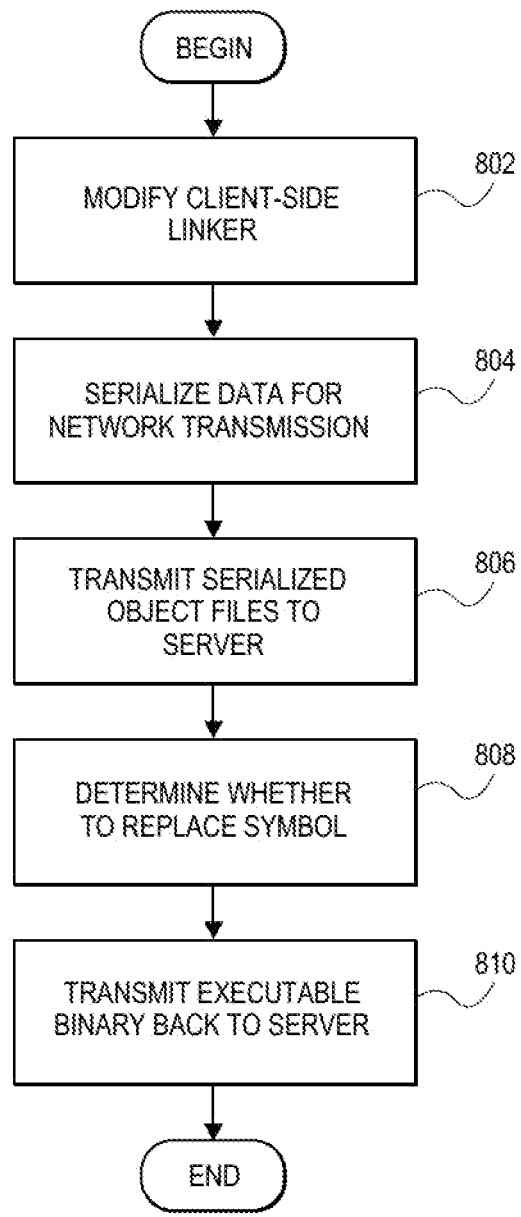
FIG. 8 is a flow diagram of a process for preparing and using a network linker to create an executable binary for an app that is security wrapped in accordance with one embodiment.

FIG. 8 is a flow diagram of a process for preparing and using a network linker to create an executable binary for an app that is security wrapped using the methods, described above. It describes execution of instructions on client-side and server-side linkers. At step 802 client-side linker component is modified to support an extra parameter inserted by the app developer, which can be described as a linker flag, for invoking network linker functionality of the present invention. The app developer has written the app and wants to security wrap the app before uploading it to an app store which has restrictions regarding the use of custom DYLIBS. In a typical scenario, the app developer has the client-side linker component of the network linker of the present invention on the developer's machine (client). The app developer compiles the app code on the local machine, creates object files and invokes the client-side linker.

Client-side linker component sees that an extra parameter, a linker "flag", indicating that a network linker will be invoked has been set (this can be done by going into linker settings and inserting an extra parameter). At step 804, parameters, symbols, invocations, and other data items are serialized using a serialization tool 718 to a format suitable for transmission over a network to a server where the server-side component of the network linker executes. For example, a serialization tool, such as Thrift, may be used to serialize the data structures for transmission to the server.

At step 806 the serialized object files and libraries are transmitted to the server. In one embodiment, before transmission, the app security provider verifies that the app developer is allowed to use the app security wrapping service. For example, the security provider may want to verify that the developer has paid for the service and is a licensee or customer. This may be done using a conventional handshake protocol or through other means. Once the app developer's use of the service is verified, the app security provider server enables receiving the object files from the developer machine. The server may also retrieve data from its own memory relating to which policies the app developer wants to use to determine security parameters of the app wrapping. The app developer may have provided or configured the policies before the process began (e.g., when the app developer initially became a customer). As described above, the policies (implemented using policy 202 and policy wrapper 208) instruct the app security wrapping code as to which restrictions and other provisions to apply when wrapping an app.

As noted, the server has an app security static library. Most of the primary linker functions are performed by the server-side linker component when the server receives the object files. As is well known in the art, a linker resolves symbols, such as functions, variables, and the like. A symbol is referenced and the linker must determine or resolve where the symbol is so that when the executable code runs, it can locate the corresponding code instructions or variable data. At step 808 the server-side linker component resolves the symbols. However, in one embodiment, the behavior of the linker is modified with respect to how to resolve symbols. The app code is resolved on all object files and libraries, including the app security program static library. As noted, certain symbols are resolved using substitution, described below, and others are resolved in a normal manner.

At step 808 it is determined whether to substitute a symbol, invocation, etc. or allow the normal resolution process to occur. Network linker 702 behavior can be described as essentially determining where or in which portion of code, an invocation or link is present. If a link or invocation lives or resides in the app security wrapping portion of the app code (recall that the security wrapping code is injected into the app code), a normal resolve occurs. That is, the link is not shimmed, instead it resolves to the normal system libraries if the link lives, for example, in a "libAPPSEC.o" file (object file of the app security program).

If the symbol invocation lives in the in the app code itself, then it is replaced with what can be described as an "app security wrapping program" equivalent of that invocation, symbol, or function. In this manner, the network linker makes it possible to exercise discretion with respect to where to shim. Thus, if the link or invocation is not in a library or other data structure of the app security wrapping code, then it is replaced or shimmed with an invocation to the security software library. This substituted library invocation may add extra processing and security to the normal operational invocations before optionally invoking the original symbol invocation. For example, the app code may invoke a "write" function. This function is shimmed with an app security code equivalent, for example, a "app-sec-write" function. The data involved or needed for the function may be processed (e.g., encrypted, scrambled, etc.), and when the security-related processing is over, the app security program calls the original "write" function in the app code to complete the call. Since the original "write" function is eventually called or used by the app security program, but not used initially, it is said to be shimmed instead of being entirely replaced or substituted. This process, done for every symbol, may also be characterized as a process of determining what code is trying to resolve a particular link.

In one embodiment, at the linking stage, a part of which is described at step 808, the app security provider may implement countermeasures in the binary executable to prevent malicious parties, such as hackers or any third-party, from inserting malware, doing harm to the code, or from simply observing execution of the code. For example, techniques such as shuffling (e.g., changing the order of function definitions in the binary executable), strategically injecting junk ARM code (e.g., security provider's own ARM code) after branch instructions, and other techniques may be used to obfuscate and counter any attempts to analyze the app code.

At step 810 the resulting executable binary is transmitted back to the app developer machine. This binary may then be uploaded by the developer to the app store without violating any restrictions on the use of custom DYLIBS. From the developer's perspective, the linking process using the network linker of the present invention is transparent she still sees an executable binary after the linking as she would using a conventional linker. In one embodiment, the developer may use the same linker as before except the linker is modified as described above. When the monolithic executable binary is shipped back to the client machine, it may then be digitally signed by the app developer and packaged for submission to the appropriate entity for approval to be uploaded to the app store or marketplace.

Other embodiments of the network linker aspect of the present invention may also be implemented. For example, some embodiments may not involve DYLIBS or app stores/marketplaces that have restrictions on their use. More generally, embodiments of the present invention include methods and systems for automating the linking stage of an app to enable customizing app code after the app is written and loaded. As described above, the present invention allows dynamically modifying existing apps without changing source code or re-building the apps. As noted, it allows injecting policy enforcement, new features, and security tools into existing apps, in other words, security wrapping an app.

As described in FIGS. 7 and 8, some embodiments describe ways of automating a process of customizing software after the software has been written without having to make changes or write new code. At one end of the spectrum are software development kits (SDKs) where code functionality is incorporated into the app via an API (published by the software provider). At the other end is straight code injection into the app binary code.

As noted, one of the goals is to be able to customize apps without having to require expertise of the app developer or other user of SDK use and without making the user perform a straight code injection, also a task requiring technical expertise. With the present invention, the app developer simply re-links the app without changing source code. As described above and is known in the art, source code is compiled to object code and is then linked to SDK libraries, etc. After the linking, there is executable code, for example, a monolithic binary code. The linking stage is automated. With some embodiments of the present invention, the user simply re-links the app without changing the source code. In one embodiment, a Web console interface is provided where a user can select pre-defined policies.

The console is used by the app developer or other user to modify the linking stage of the app so that the new linking using the network linker is done automatically without changing code directly. The app code does not take the conventional route to the normal libraries provided by the operating system of the device for file I/O, networking, and the like. As noted above, instead of going to the conventional libraries, the code goes to app security provider libraries supplied by a third-party service provider, such as Mocana Corporation of San Francisco, Calif.

In one embodiment, a layer is provided by the app security provider that functions as a library and that mirrors the conventional o/s-supplied library. An app is the binary code of an app without the added or tacked on layer for typical file I/O operations, such as open, read, write, etc. Typical calls, such as open, read, write, etc. go directly to a file I/O library. App code has a layer that does not alter the code itself but automatically re-links, such as a "file open" invocation, to an app security provider supplied "file open" invocation, similar to the process described above in FIG. 8.

The service provider supplied "file open" invocation then calls the file open call in the operating system library. For example, the library minors the I/O library with invocations to open, read, write, etc. The layer knows what code to look for in the operating system. The app security provider library layer is attached to (or tacked onto) the monolithic executable binary instead of being attached to the operating system library. In this manner, the calls from the app must go through the app security provider library first before reaching the operating system library. For example, the security provider's version of "open" is called first, then the call is sent to the o/s library, but only after the app security provider has performed the appropriate action on the call, such as encrypting it or performing another security-related operation on it. The "open" function is not changed in the app itself. For example, the code in the app is not changed to "app security provider open" or the like; it remains as an open function. As described above, no SDKs are used for this either.

The app security provider layer provides a way of leaving symbol invocations the same (e.g., with the same name, same parameters, APIs, syntax, and so on). However, at link time, the calls are sent to the app security provider's functions. These functions perform any functions related to, for example, security or policy enforcement (require password entry, encrypt/decrypt, etc.) and then the invocation is sent to the o/s library. The app security provider layer, as noted, becomes part of the monolithic binary. The o/s library is still called, but through the app security provider layer.

Figure 9A:
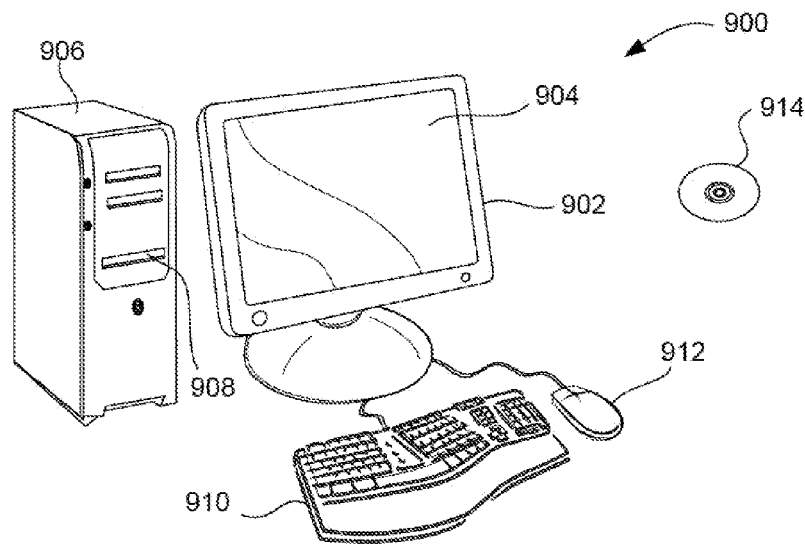
FIGS. 9A and 9B are block diagrams of a computing system suitable for implementing various embodiments of the present invention.
Figure 9B:
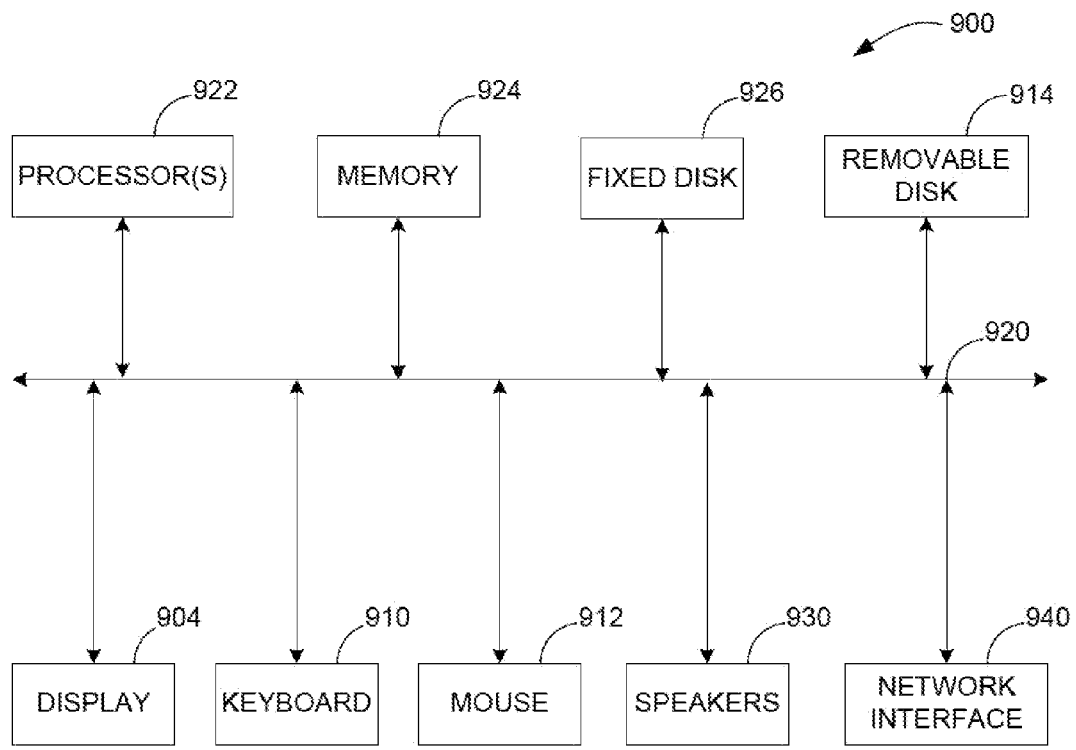

FIGS. 9A and 9B illustrate a computing system 900 suitable for implementing embodiments of the present invention. FIG. 9A shows one possible physical form of the computing system. Of course, the computing system may have many physical forms including an integrated circuit, a printed circuit board, a small handheld device (such as a mobile telephone, handset or PDA), a personal computer or a super computer. Computing system 900 includes a monitor 902, a display 904, a housing 906, a disk drive 908, a keyboard 910 and a mouse 912. Disk 914 is a computer-readable medium used to transfer data to and from computer system 900.

FIG. 9B is an example of a block diagram for computing system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

We claim:

1. A method of linking a security wrapped app during development of the app using a network linker having a client linker component and a server linker component, the method comprising:

modifying the client linker component of the network linker to include a network linker flag parameter;

serializing, by a microprocessor, object files of the app on the client linker component for transmission over a network to the server linker component;

determining whether a symbol invocation in the object files is being made from within app code or from within app security wrapping code injected into the app code;

replacing the symbol invocation with a substitute invocation that makes a call to an app security program static library;

creating an executable binary file on the server linker component; and transmitting the executable binary file to the client linker component, wherein the executable binary file does not make any custom dynamic library calls.

2. A method as recited in claim 1 further comprising:
checking for the network linker flag parameter in the client linker.

3. A method as recited in claim 1 further comprising:
adding the network linker flag parameter to the client linker component, thereby signaling the network linking.

4. A method as recited in claim 1 further comprising:
injecting app security code into app.

5. A method as recited in claim 1 further comprising:
signing the binary executable file on the client linker component; and
preparing the executable file for uploading to an app store.

6. A method as recited in claim 1 wherein the network linker flag parameter is defined by the app security provider and sent to an app developer.

7. A method as recited in claim 6 further comprising:
verifying that the app developer is authorized to use the app security wrapping.

8. A method as recited in claim 1 further comprising:
transmitting the object files of the app to the server linker component.

9. A method as recited in claim 1 wherein the server linker component is under control of the app security provider.

10. A method as recited in claim 1 further comprising:
if the symbol invocation is being made from within app security wrapping code, the symbol invocation is resolved to normal system libraries.

11. A method comprising:
receiving a plurality of app object files from a client-side linker component, the plurality of app object files received at a server-side linker component;
determining that a first symbol invocation in the plurality of app object files is being made from within app code;
replacing, by a microprocessor, the first symbol invocation with a substitute invocation to make a first call to an app security program static library;
determining that a second symbol invocation in the plurality of app objects files is being made from within app security wrapping code injected into the app code;
maintaining the second symbol invocation to make a second call to a normal system library corresponding to the plurality of app object files; and
transmitting an executable binary generated using the plurality of app object files to the client-side linker component.

12. The method of claim 11, wherein the executable binary file does not make any custom dynamic library calls.

13. The method of claim 11, wherein the executable binary is a monolithic executable binary.

14. The method of claim 11, wherein the executable binary file is digitally signed by a client device running the client side linker component.

15. The method of claim 11, wherein the executable binary file is uploaded to an app store or marketplace after it is digitally signed.

16. A device comprising:
an interface included in a server-side linker component, the interface receives a plurality of app object files from a client-side linker component; and
a processor to determine that a first symbol invocation in the plurality of app object files is being made from within app code and to replace the first symbol invocation with a substitute invocation to make a first call to an app security program static library, wherein the processor determines that a second symbol invocation in the plurality of app objects files is being made from within app security wrapping code injected into the app code and maintain the second symbol invocation to make a second call to a normal system library corresponding to the plurality of object files;
wherein the interface is further operable to transmit an executable binary generated using the plurality of app object files to the client-side linker component.

17. The device of claim 16, wherein the executable binary file does not make any custom dynamic library calls.

18. The device of claim 16, wherein the executable binary is a monolithic executable binary.

19. The device of claim 16, wherein the executable binary file is digitally signed by a client device running the client-side linker component.

20. A non-transitory computer-readable medium comprising:
computer code for receiving a plurality of app object files from a client-side linker component, the plurality of app object files received at a server-side linker component;
computer code for determining that a first symbol invocation in the plurality of app object files is being made from within app code;
computer code for replacing the first symbol invocation with a substitute invocation to make a first call to an app security program static library;
computer code for determining that a second symbol invocation in the plurality of app objects files is being made from within app security wrapping code injected into the app code;
computer code for maintaining the second symbol invocation to make a second call to a normal system library corresponding to the plurality of app object files; and
computer code for transmitting an executable binary generated using the plurality of app object files to the client-side linker component.

* * * * *